US009908288B2

(12) United States Patent
Harkness et al.

(10) Patent No.: US 9,908,288 B2
(45) Date of Patent: Mar. 6, 2018

(54) FREE-FORM SPATIAL 3-D PRINTING USING PART LEVITATION

(71) Applicant: The Boeing Company, Chicago, IL (US)

(72) Inventors: William A. Harkness, Mukilteo, WA (US); Josh H. Goldschmid, Woodinville, WA (US)

(73) Assignee: THE BOEING COMPANY, Chicago, IL (US)

(*) Notice: Subject to any disclaimer, the term of this patent is extended or adjusted under 35 U.S.C. 154(b) by 660 days.

(21) Appl. No.: 14/446,141

(22) Filed: Jul. 29, 2014

(65) Prior Publication Data

US 2016/0031156 A1    Feb. 4, 2016

(51) Int. Cl.
| | |
|---|---|
| B29C 67/00 | (2017.01) |
| B29C 64/112 | (2017.01) |
| B29C 64/20 | (2017.01) |
| B33Y 10/00 | (2015.01) |
| B33Y 30/00 | (2015.01) |
| B29L 9/00 | (2006.01) |
| B29C 64/40 | (2017.01) |

(52) U.S. Cl.
CPC ........ *B29C 67/0059* (2013.01); *B29C 64/112* (2017.08); *B29C 64/20* (2017.08); *B29C 67/0092* (2013.01); B29C 64/40 (2017.08); B29L 2009/00 (2013.01); B33Y 10/00 (2014.12); B33Y 30/00 (2014.12)

(58) Field of Classification Search
CPC . B29C 67/0059; B29C 67/0092; B33Y 10/00; B33Y 30/00
See application file for complete search history.

(56) References Cited

U.S. PATENT DOCUMENTS

| | | | |
|---|---|---|---|
| 5,036,944 A | 8/1991 | Danley et al. | |
| 2004/0204785 A1* | 10/2004 | Richardson | ........... B22F 3/1055 700/118 |
| 2009/0198574 A1* | 8/2009 | Guerra | .................. B29C 44/022 705/14.23 |
| 2015/0021830 A1* | 1/2015 | Yerazunis | ........... B29C 67/0055 264/401 |
| 2017/0100898 A1* | 4/2017 | Cofler | ................. B29C 67/0092 |

OTHER PUBLICATIONS

Kim et al., "High-precision magnetic levitation stage for photolithography," Precision Engineering, vol. 22 No. 2, Apr. 2008, pp. 66-77.*
Verma et al., "Multi-Axis Maglev Nanopositioner for Precision Manufacturing and Manipulation Applications," IEEE Transactions on Industry Applications, vol. 41 No. 5, Sep./Oct. 2005.*

(Continued)

*Primary Examiner* — Timothy Kennedy
*Assistant Examiner* — Baileigh Kate Darnell
(74) *Attorney, Agent, or Firm* — Yee & Associates, P.C.

(57) ABSTRACT

A part is fabricated by an additive manufacturing process while levitating in space. Constituent features of the part are formed by 3-D printing. A part levitation system allows the spatial orientation of the part to be manipulated relative to one or more print heads.

21 Claims, 8 Drawing Sheets

(56) References Cited

OTHER PUBLICATIONS

"Kraftmessung an verschiedenen Fluiden in akustischen Feldern," Swiss Federal Institute of Technology, Laboratory of Thermodynamics in Emerging Technologies (LTNT), Sep. 2013, 6 pages.

Foresti et al., "Acoustophoretic contactless transport and handling of matter in air," PNAS Early Edition, Jul. 2013, 6 pages.

Foresti et al., "On the acoustic levitation stability behaviour of spherical and ellipsoidal particles," Journal of Fluid Mechanics, vol. 709, Oct. 2012, pp. 581-592.

Halterman, "Metal Printing for the Small Shop Floor—Vader Printer," 3D Printer World, Punchbowl Media, Oct. 2013, 4 pages, accessed Jul. 29, 2014. http://www.3dprinterworld.com/article/metal-printing-for-small-shop-floor-vader-printer.

"Quantum Levitation," Association of Science-Technology Centers, YouTube video, posted Oct. 2011, 4 pages, accessed Jul. 29, 2014. http://www.youtube.com/watch?v=Ws6AAhTw7RA.

"Quantum Experience," Quantum Experience Ltd., copyright 2014, 2 pages, accessed Jul. 29, 2014. http://quantumlevitation.com/corporate-layout/.

\* cited by examiner

FREE-FORM SPATIAL 3-D PRINTING USING PART LEVITATION

BACKGROUND INFORMATION

1. Field

The present disclosure generally relates to additive manufacturing processes, and deals more particularly with a method and apparatus for 3-D printing a part in free space using part levitation.

2. Background

Additive Manufacturing (AM) is a process that creates physical parts directly from a 3-D (three dimensional) CAD (computer aided design) file using computer controlled additive fabrication techniques. Common AM techniques, sometimes also referred to as 3-D manufacturing, include stereolithography (SLA), fused deposition modeling (FDM), selective laser sintering (SLS) and three dimensional printing (3-DP), to name only a few. Each of these processes builds a three dimensional solid part, layer-by-layer, by locally fusing or curing building materials that may be in powder or liquid form.

Each of the AM processes mentioned above employs a "bottoms-up" building method in which the part is built layer-by-layer on a supporting platform that moves down as the individual layers are formed. A single print head is moved around the platform to form each of the layers. In some cases, it is necessary to build the part on support materials which must be later removed from the part. The need for a platform and support materials to stabilize the part limits the geometry and/or features of a part that can be fabricated. Moreover, the use of a single print head to form features of each layer renders the fabrication process relatively slow.

Accordingly, there is a need for an AM method and apparatus that eliminates the need for a platform and/or support materials to stabilize the part during the fabrication process, and which removes limitations on the types of features that can be formed, allowing full body 3-D printing of complex parts. There is also a need for a method and apparatus of the type mentioned above which increases the speed of the fabrication process.

SUMMARY

The disclosed embodiments provide an additive manufacturing method and apparatus for free-form fabrication of three-dimensional parts. The part is levitated in space and can be moved and/or rotated to any angle in order to form desired features at any location on the part without the need for support structures to stabilize the part. Multiple print heads may be employed to simultaneously print features of the part, thereby increasing fabrication speed.

According to one disclosed embodiment, an additive fabrication method is provided. A feature of a part is formed by printing material into space. The feature may be formed by printing a nugget of material into space and then printing additional material onto the nugget. The part is levitated and its spatial orientation is changed while levitating. Alternatively, an object forming a base or starting point may be placed in space and levitated, following which material may be printed onto the object. Another feature of the part is formed by printing material into space. The steps of changing the spatial orientation of the part and printing material into the space are repeated until an entire part is formed. Printing material into space is performed by jetting or extruding the material into space. The printing may be performed by a plurality of print heads located at different positions around the space. Levitating the part may be performed by acoustic levitation or magnetic levitation. In one variation, magnetic levitation is performed by supercooling the part, and subjecting the part to a magnetic field that produces a magnetic force repelling the part. Levitation of the part is achieved by applying a levitating force to the part which is substantially equal to a gravitational force acting on the part, and changing the spatial orientation of the part is performed altering the levitating force. Printing material into space is performed from different directions by multiple print heads. The method may further comprise changing the spatial orientation of the print heads relative to the part by moving the print heads relative to the part.

According to another disclosed embodiment, an additive fabrication method is provided, comprising forming differing constituent features of a part by depositing a material into space, levitating the constituent features of the part while the material is being deposited into space, and spatially manipulating the constituent features of the part. Depositing material into space is performed by a plurality of print heads, and levitating the part may be performed by magnetic levitation. In one variation, the magnetic levitation is performed by supercooling the part until the part becomes a superconductor, and subjecting the part to a magnetic field producing a magnetic force that is substantially equal to gravitational force acting on the part. In another variation, levitation is achieved by producing an acoustic standing wave pattern having a node exhibiting a sound pressure force substantially equal to gravitational force, and trapping the part within the node. The method may further include sensing a position of the part in the space, and manipulating the part based on the sensed position of the part. The method may also include stabilizing the part within the space. The magnetic levitation may be accomplished by placing a magnet beneath the part within the space, and generating a repulsive force between the part and the magnetic that is substantially equal to a gravitational force acting on the part.

According to still another disclosed embodiment, apparatus is provided for additive fabrication of a part. The apparatus comprises at least one print head for depositing a material into a space to form features of the part, and a levitation system for levitating the part in the space as the features are being formed by the print head. The apparatus may also comprise a plurality of print heads located around the space, each of the heads being capable of depositing material into the space to form features of the part, and a displacement system coupled with each of the print heads for displacing each of the print heads relative to the part. The levitation system includes at least one magnet for generating a magnetic force substantially equal to a gravitational force acting on the part. The levitation system may also include at least one acoustic radiator for radiating a sound wave of alternating frequency, and an acoustic reflector positioned to reflect the sound wave. The acoustic radiator and the acoustic reflector are arranged to form a standing wave pattern having a node in which the part is trapped and levitated. The levitation system may further include position sensors for sensing the position of the part in the space, and a stabilization system for stabilizing levitation of the part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
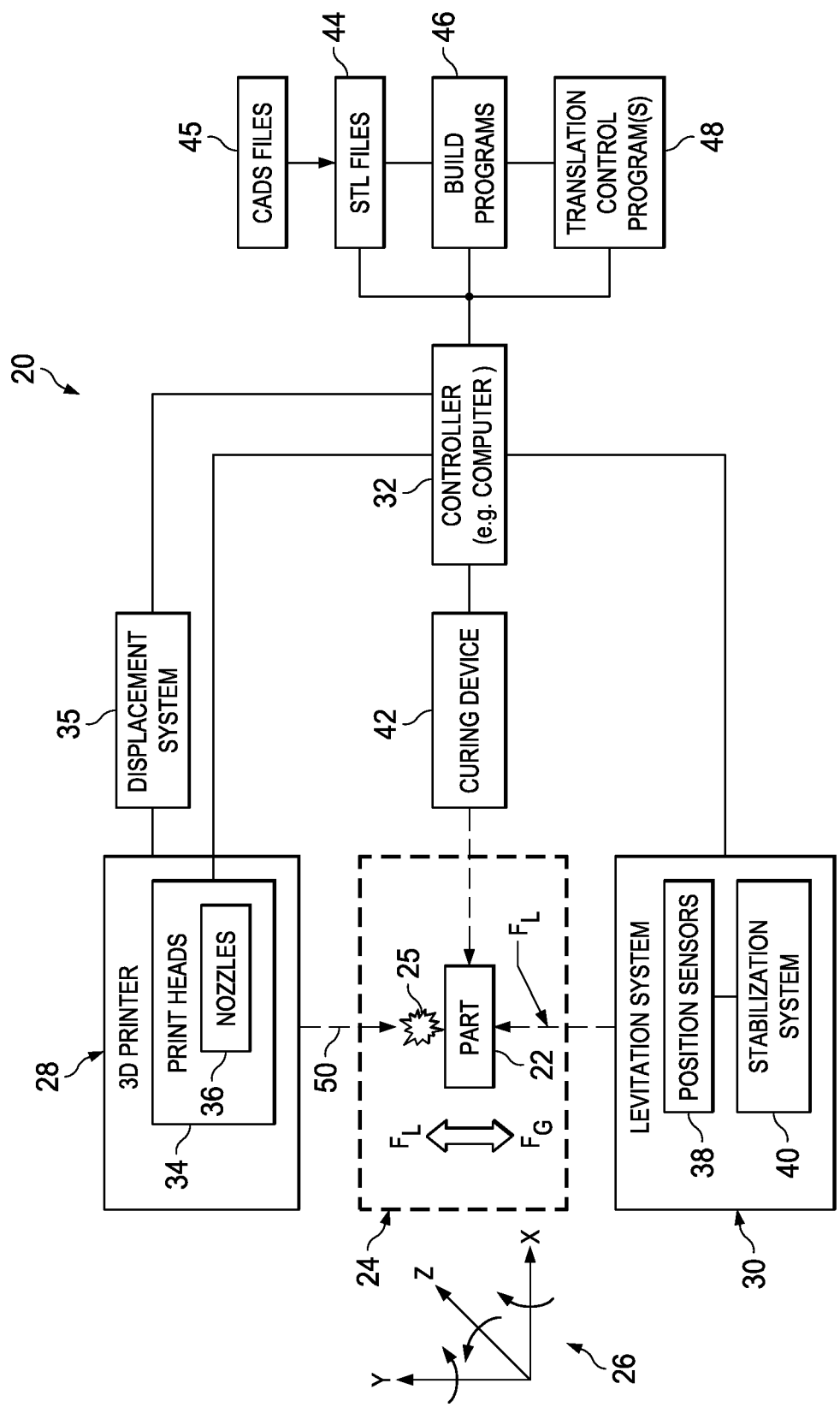
FIG. 1 is an illustration of an overall block diagram of apparatus for free-form spatial 3-D printing of a part.

FIG. 1 illustrates the overall components of an apparatus 20 for full body, free-form 3-D printing and levitating a part in space. The apparatus 20 broadly comprises a 3-D printer 28 for additive fabrication of a part 22, and a levitation system 30 for levitating and translating the part 22 within a coordinate system 26 in free-space 24 during the fabrication process. The levitation system 30 applies a levitational force $F_L$ to the part 22 which is substantially equal to the gravitational force $F_G$ acting on the part 22, resulting in the part 22 being suspended or levitated within the space 24.

The 3-D printer 28 may comprise any of a variety of known devices that build the part 22 by selectively placing and adding material 25 to the part 22. The 3-D printer 28 may include one or more print heads 34 located at different positions around the space 24, each of which may include a plurality of nozzles 36 for extruding, propelling or jetting 50 material 25 into the space 24.

Depending upon the type of material 25 used to fabricate the part 22, one or more curing devices 42 such as, without limitation, a laser may be employed to cure and thereby harden the material 25 as the part 22 is being fabricated. In one embodiment, a displacement system 35 may be employed to move the print heads 34 relative to the part 22 within the coordinate system 26, while in other embodiments the print heads 34 may remain stationary while the levitation system 30 displaces, rotates or otherwise changes the spatial orientation of the part 22 relative to the print heads 34 within the coordinate system 26. The spatial orientation of the part 22 may be altered based on the location and orientation of the part 22 sensed by the position sensors 38 discussed below. In still other embodiments, both the print heads 34 and the part 22 may be displaced during the additive fabrication process.

The levitation system 30 may be based on any of several types of levitation technologies, such as, without limitation, acoustic levitation and any of several types of magnetic levitation, such as, without limitation quantum levitation and electrostatic levitation. Other types of levitation systems are possible, depending upon the application, and the type of material 25 employed to fabricate the part 22. The levitation system 30 may include one or more position sensors 38 for sensing the position and attitude of the part 22 in space 24. Also, depending upon the type of levitation technology being employed, the levitation system 30 may include a stabilization system 40 for stabilizing the part 22 in order to achieve stabilized, accurate positioning of the part relative to the print heads 34 throughout the printing process. The stabilization system 40 may provide both static stability to alleviate small displacements of the part 22 away from a stable equilibrium point, as well as dynamic stabilization in order to dampen out any vibration-like motion of the part 22 that may occur.

The apparatus 20 further includes one or more controllers 32 such as special-purpose or general purpose programmed computer that control operation of the 3-D printer(s) 28, the levitation system 30 and the curing device 42. The controller 32 has access to STL (stereolithography) files 44, one or more build programs and translation control programs 48. The part 22 is defined by one or more 3-D CAD (computer aided design) files 45 that are converted to STL files 44. The STL files 44 describe the surface geometry of the part 22 in a program language that allows the part 22 to be fabricated by the 3-D printer 28. The build programs 46 are used by the controller 32 to control operation of the 3-D printer 28 based on the STL files 44. The translation control programs 48 are used by the controller 32 to control translation (movement and/or rotation) of the part 22 using the levitation system 30.

Figure 2:
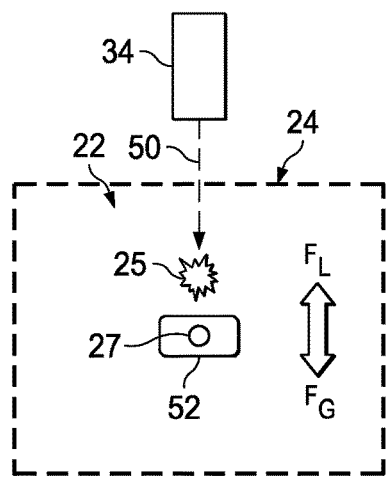
FIGS. 2-7 are diagrammatic illustrations showing sequential 3-D printing features of a part levitated in space.

Attention is now directed to FIGS. 2-7 which show several sequential steps used to build a typical part 22. As shown in FIG. 2, in one embodiment, a 3-D printer head 34 jets 50 material 25 into a location in space 24, forming an initial nugget 27 that is captured and held in equilibrium within space 24 by the levitation system 30 (FIG. 1). Additional material 25 may then jetted 50 onto and incrementally added to the nugget 27 until a desired feature 52 of the part 22, or a portion of the feature 52, is formed. One or more non-contact position sensors 38 (FIG. 1) may be used to determine the exact location where the material 25 has been deposited within the space 24.

The material 25, including the initial nugget 27, forming the feature 52 is levitated in space 24 by a levitation force $F_L$ that is substantially equal to the force of gravity $F_G$ acting on the material 25 that forms the feature 52. As the weight of the part 22 increases due to material 25 being incrementally added, the stabilization system 30 adjusts the levitation force $F_L$ in real time to compensate for the increases in part weight, thereby maintaining a desired position of the part 22 in space 24 throughout the printing process.

In the embodiment discussed immediately above, the starting point for the additive build process is the nugget 27 which forms an initial base onto which additional material 25 is applied. In other embodiments, however, the starting point for the additive build process may comprise any suitable pre-formed particle, object or physical feature that is placed in the space 24 and then levitated, forming an initial base onto which material 25 is printed by the print heads 34.

Figure 3:
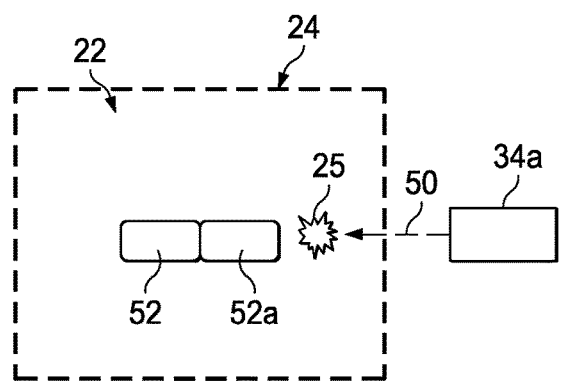
Figure 4:
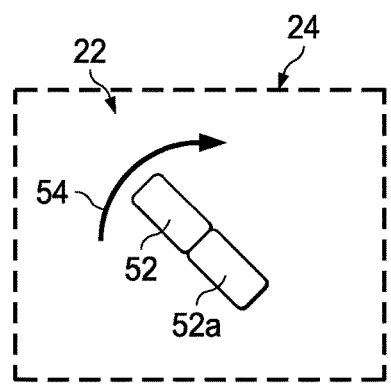
Figure 5:
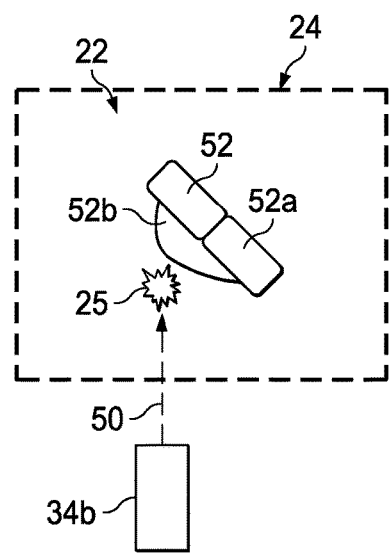

In FIG. 3, another print head 34a jets 50 material 25 into space 24 at a location that forms part of another feature 52a of the part 22 that is contiguous to the first feature 52. Next, as shown in FIG. 4, the levitation system 30 (FIG. 1) rotates 54 the partially formed part 22 into a desired position in space 24 in preparation for adding additional material 25 to form further features of the part 22. Again, position sensors 38 determine the precise location and orientation of the part 22 in space 24 and the feed this position information to the controller 32 for use in controlling the operation of the print heads 34 and the levitation system 30. Referring to FIG. 5, with the partially formed part 22 having been rotated 54 as shown in FIG. 4, another print head 34b jets 50 material 25 onto the partially formed part 22 to form still another feature 52b.

Figure 6:
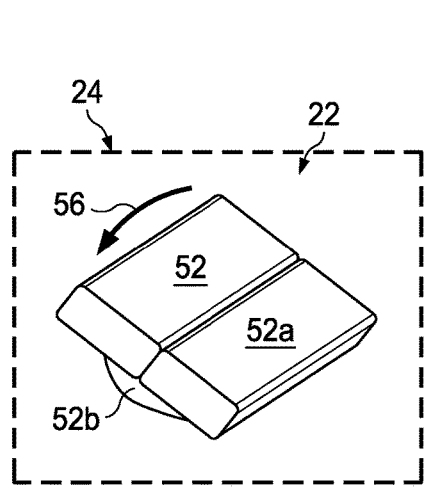
Figure 7:
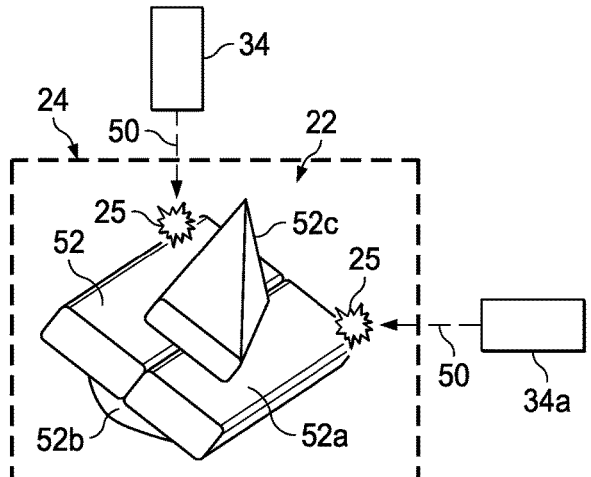

As shown in FIG. 6, the partially formed part 22 is again rotated 56 to a desired position in space 24 in preparation for adding additional material 25 to the partially formed part 22. Then, as shown in FIG. 7, two of the print heads 34, 34a jet 50 additional material 25 from differing directions, either simultaneously or sequentially, to form still another feature 52c of the part 22. In the embodiment shown in FIGS. 2-7, three print heads 34, 34a, 34b are employed, however in other embodiments more than three or as few as one print head 34 may be employed to jet 50 material 25 into space 24 and incrementally form various features of the part 22.

In the embodiment shown in FIGS. 2-7, the levitation system 30 is employed to translate the partially formed part 22 relative to the print heads 34, 34a, however in other embodiments, the part 22 may remain substantially stationary, levitated in space 24, while the print heads 34, 34a, 34b are translated relative to the part 22. In still other embodiments, both the part 22 and the print heads 34, 34a may be translated in order to achieve desired orientations of the part 22 relative to the print heads 34, 34a.

In the embodiment shown in FIGS. 2-7, the entire part 22 is printed by incrementally adding material 25 to an initial nugget 27 of material 25 that is printed in space 24. In other embodiments however, the part 22 may be printed by printing two or more nuggets 27 at separated locations in the space 24, and then incrementally adding material 25 to each of the nuggets 27 according to part build programs (FIG. 1), which specify the sequence in which the features 52 of the part 22 are to be printed. The portions of the part 22 that are printed at separated locations in space 24 and originate from differing nuggets 27 are combined into the part 22 as additional material 25 is added that joins the portions together into the various features of the part 22. In still other embodiments, it may be possible to place and levitate a component, such as, for example and without limitation, a shaft (not shown), of the part 22 in space 24, and then form additional features 52 of the part 22 by printing material 25 onto the component.

Figure 8:
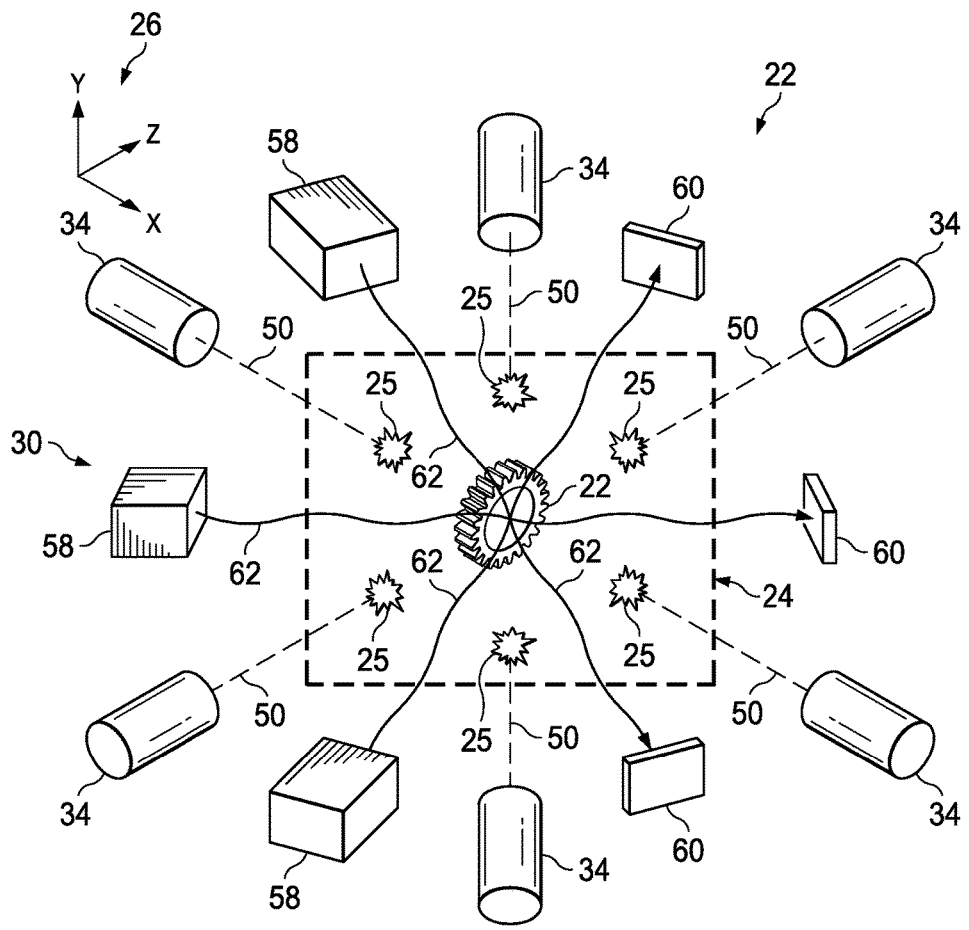
FIG. 8 is an illustration of an isometric view of an apparatus for 3-D printing a part while acoustically levitated in space.

FIG. 8 illustrates an embodiment of the apparatus that employs multiple print heads 34, and an acoustic-type levitation system 30 for levitating a part 22 during the 3-D printing process. The use of an acoustic type levitation system 30 may be desirable in some applications because its ability to levitate objects is not dependent upon the type of material from which the object is formed. In this illustrative embodiment, a set of six print heads 34 are arranged at different positions along the X, Y and Z axes to jet 50 material 25 from six different directions (left, right, front, back, top and bottom) into space 24 in order to sequentially or simultaneously form differing portions of a part 22, which in the illustrated example is a simple gear. More or less than six print heads 34 may be employed and may be positioned at any desired location surrounding the space 24 within which the part 22 is levitated. Each of the print heads 34 may be of the type previously described having multiple nozzles 36 (FIG. 1) which jet, propel or extrude material 25 into the space 24. The material 25 may comprise a liquid metal which is magnetic or diamagnetic, or any suitable polymer.

Figure 9:
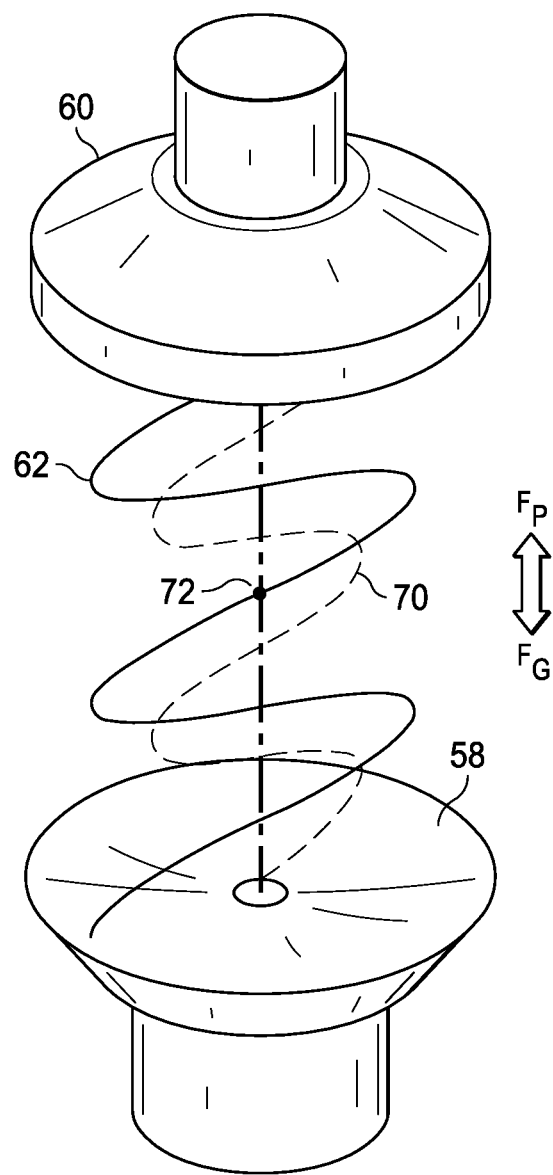
FIG. 9 is an illustration of a perspective view of an acoustic radiator and a reflector, showing the formation of a standing wave pattern having a node used to acoustically levitate a part.

The acoustic levitation system 30 comprises one or more pairs of acoustic radiators 58 and acoustic reflectors 60. The radiators 58 and reflectors 60 in each pair thereof face each other and are located on opposite side of the space 24 which forms an acoustic chamber within which the part 22 or other object is levitated. Referring to FIG. 9, each of the radiators 58 vibrates at a preselected frequency, emitting a varying acoustic or sound pressure wave 62 (FIGS. 8 and 9) that passes through the space 24 and is reflected back from the associated reflector 60 as a reflected wave 70 (FIG. 9). The radiated wave 62 and the reflected wave 70 interfere with each other to produce a standing wave pattern defined by one or more nodes 72. The sound pressure force $F_P$ produced at node 72 is equal in magnitude to, but opposite in direction to the gravitational force $F_G$ exerted on the part 22 at the point in space 24 where the node 72 occurs, thereby trapping and levitating the part 22 at the node 72. By changing the amplitude and/or frequency and/or orientation of the sound pressure wave 62, the node 72 and thus the part 22 trapped at the node 72, can be made to move and/or rotate within the space 24 to any desired location and orientation.

Figure 10:
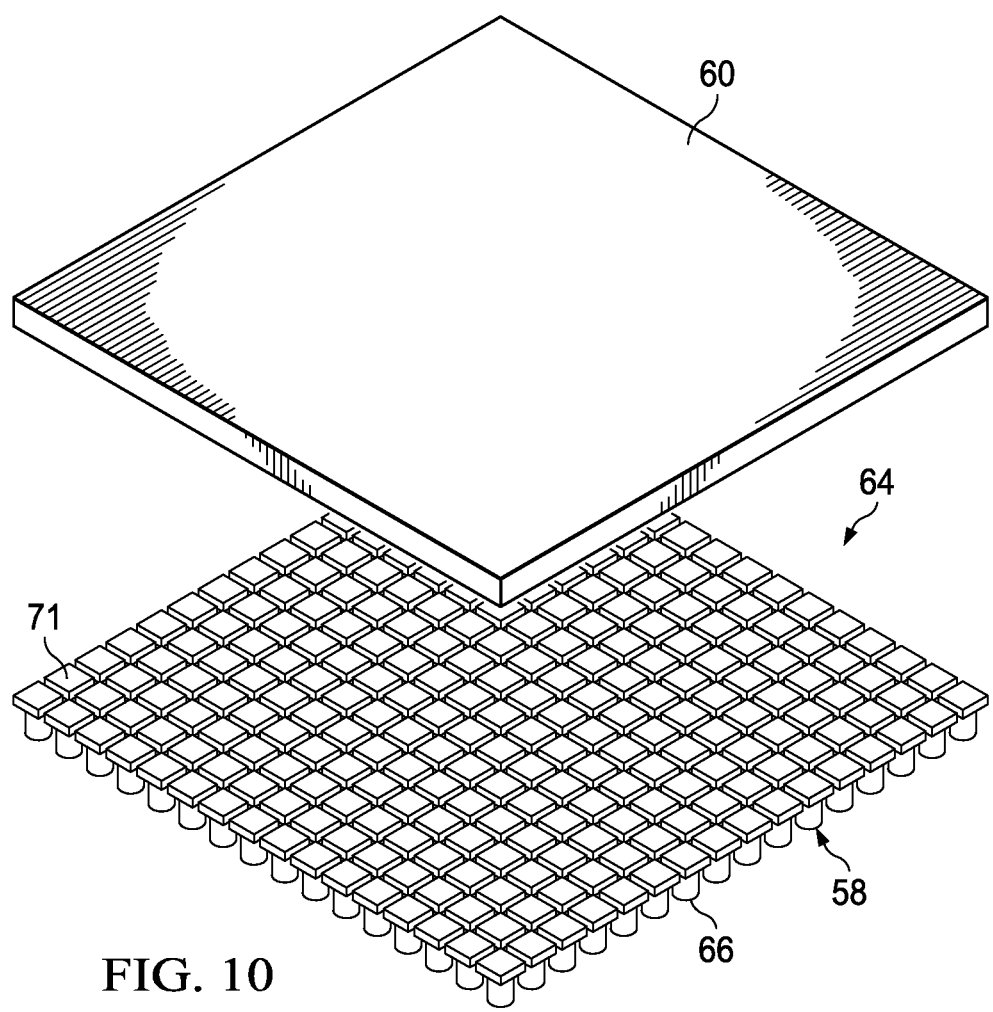
FIG. 10 is an illustration of a perspective view of an array of acoustic radiators and a reflector used for acoustic levitation of a part.

Referring to FIG. 10, each of the radiators 58 may comprise a 2-D array 64 of acoustic wave devices such as piezoelectric transducers 66, for generating sound waves of varying frequency. Each of the piezoelectric transducers 66 includes an emitting surface 71 for emitting the varying (e.g. sinusoidal) sound wave 62 (FIG. 8). The piezoelectric transducers 66 are controlled by the controller 32 (FIG. 1) and translation control program 48 to selectively generate the radiated sound wave 62 at differing locations over the surface of the radiator 58. By changing the location on the radiator 58 from which the sound wave 62 emanates, the location of the node 72 can be shifted, thereby moving the part 22 trapped in the node 72 to a desired location.

By selectively, or co-operatively controlling the various radiators 58 located around the part 22 in space 24, the part 22 can be translated and/or rotated to any desired position relative to one or more of the print heads 34. In the event that any variations occur in the amplitude or frequency of the radiated or reflected sound waves 62, 70 that occur which cause shifting of the node 72 and undesired displacement of the part 22, the stabilization system 40 can be actuated in order to stabilize the standing wave pattern and thereby fix the position of the node 72 and part 22 as material 25 is being printed.

Figure 11:
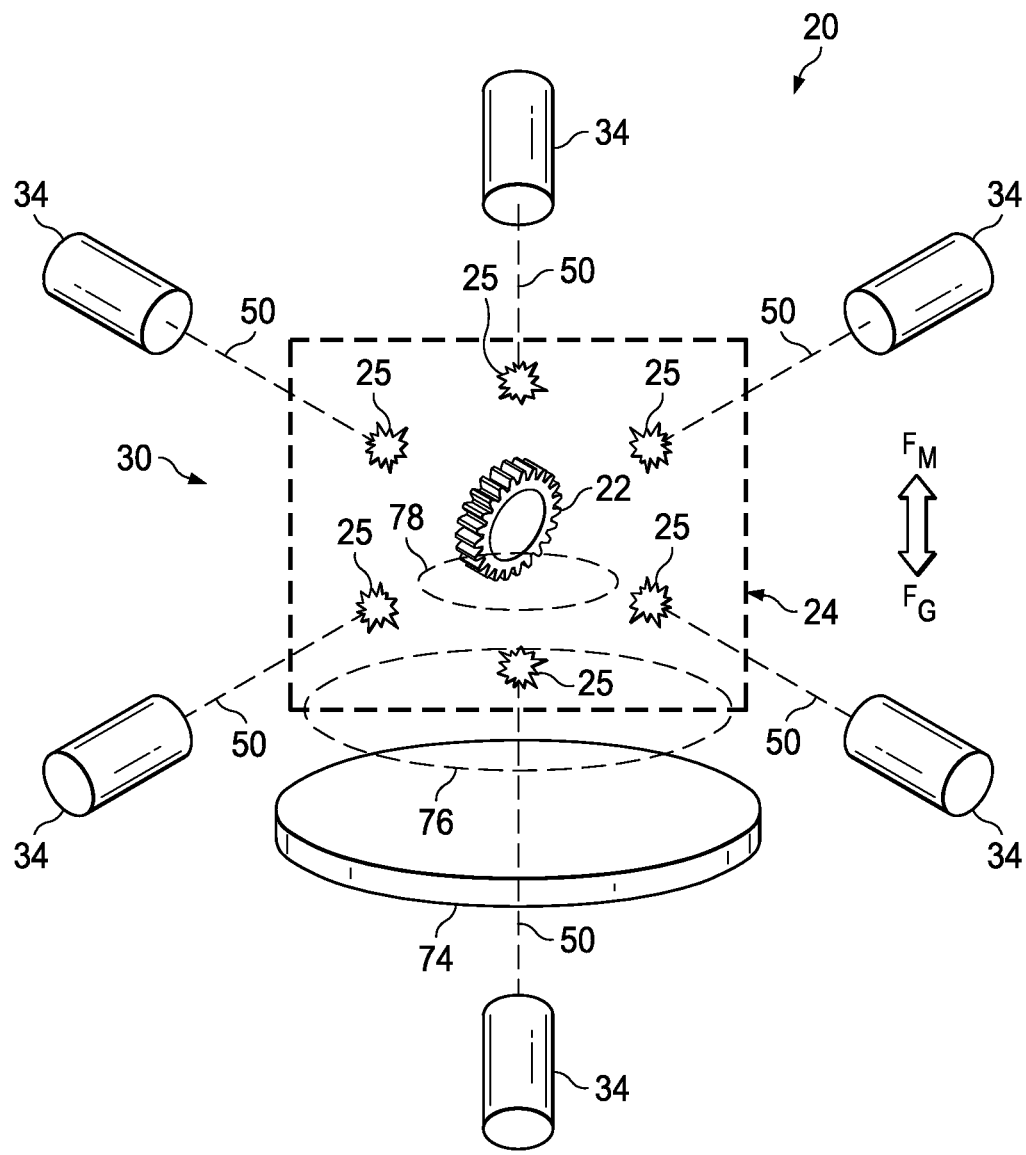
FIG. 11 is an illustration of a perspective view of an alternate form of an apparatus for 3-D printing a part while magnetically levitated in space.

Attention is now directed to FIG. 11 which illustrates another embodiment of the apparatus 20 that employs a magnetic-type levitation system 30 in which a magnetic force $F_M$ is used to counteract gravitational force $F_G$ acting upon the part 22. Depending upon the application, any of a variety of magnets 74 located beneath the spaced 24 may be employed to generate the lift necessary for magnetic levitation, including but not limited to permanent magnets, electromagnets and superconducting magnets. In this example, the print heads 34 jet 50 or extrude 50 material 25 into space 24.

Depending upon the type of magnetic levitation being employed, the material 25 may comprise a ferromagnetic, a paramagnetic, or a diamagnetic material. For example, the material 25 may comprise a liquid metal exhibiting magnetic properties, in which a magnetic field may be induced. A permanent magnet or an electromagnet 74 generates a first magnetic field 76 which is coupled with the part 22. A second magnetic field 78 induced in the part 22 opposes and repels the first magnetic field 76, causing the part 22 to be suspended. The second magnetic field 78 may be generated as a result of the part 22 being formed of a superconducting material or may be generated as a result of an electrical current induced in the part 22 by the magnet 74.

Where the part 22 is formed of a superconducting material, the levitation system 30 may comprise a quantum-type levitation system which is based on the principle that a superconductor in a magnetic field 76 will always expel the magnetic field 78 inside of it, causing the superconductor to be repelled by the magnetic field 76. The superconducting material may be an element, an inter-metallic alloy or a compound that will conduct electricity without substantial resistance below a certain temperature. The part 22, as well as the material 25 that is incrementally added to the part 22, may be supercooled to render it superconductive. The magnetic field 76 may be produced by a permanent magnet 74 or by an electromagnet 74, as previously described. In the case of a quantum levitation system, supercooled, superconducting material 25 that is propelled into the space 24 by the print heads 34 is levitated and can be manipulated using the magnet 74 located beneath the space 24. The superconducting material 25 used to incrementally fabricate the part 22 remains above the magnet 74, essentially being pushed away by the strong magnetic field produced by the magnet 74. The repulsive force $F_M$ resulting from the magnetic repulsion between the superconducting material 25 and the magnet 74 is substantially equal to the gravitational force $F_G$ exerted upon the part 22.

Figure 12:
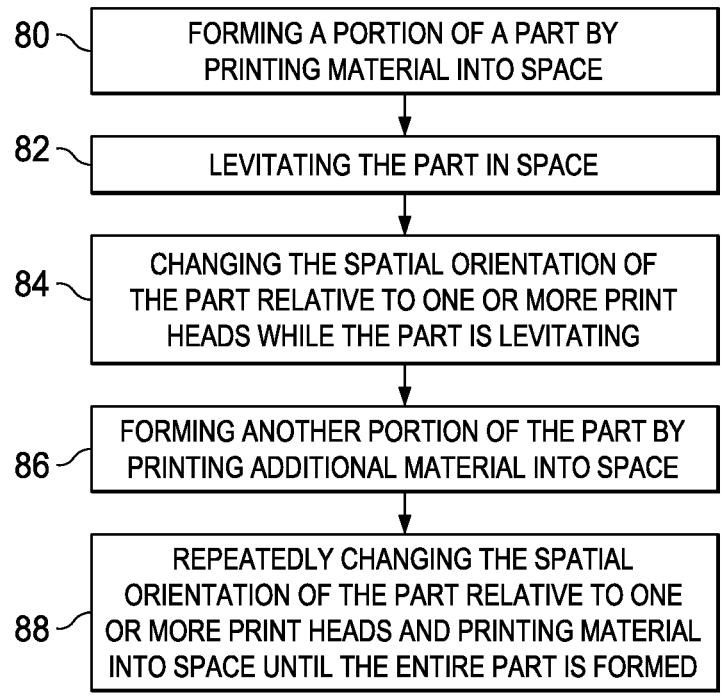
FIG. 12 is an illustration of a flow diagram of a method of 3-D printing and levitating a part in space.

Attention is now directed to FIG. 12 which broadly illustrates the overall steps of a method of free-form, 3-D printing of a part 22 while the part 22 is levitated in space 24. Beginning at 80, a portion of the part 22 is formed by printing material 25 into space 24. As previously described, in some embodiments this printing process may be initiated by jetting 50 an initial nugget 27 of material 25 into space 24, and then, at 82, levitating the nugget 27 in equilibrium until additional material 25 is jetted 50 onto and combined with the nugget 27 to form a feature 52, or a portion of a feature 52. At step 84, the spatial orientation of the part 22 is changed relative to one or more print heads 34 while the part is levitating. At 86, another portion of the part 22 is formed by printing additional material into space 24. As shown at 88, the spatial orientation of the part 22 relative to one or more print heads 34 is repeatedly changed and material is repeatedly printed into space until the entire part 22 is formed.

Figure 13:
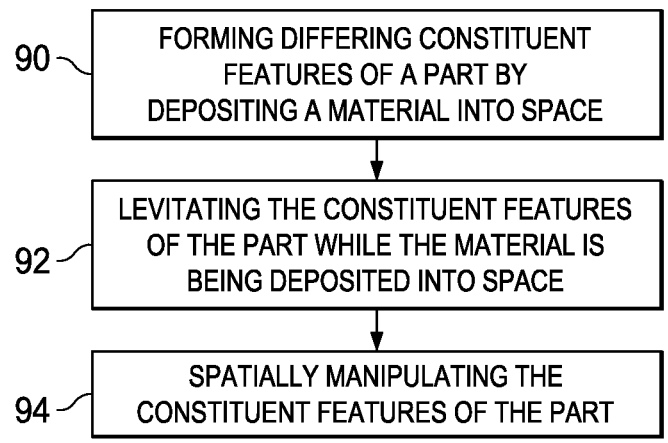
FIG. 13 is an illustration of a flow diagram of an alternative embodiment of a method of 3-D printing and levitating a part in space.

FIG. 13 broadly illustrates the overall steps of an alternate method of free-form, 3-D printing of a part 22 while the part 22 is levitated in space 24. At 90, differing constituent features of the part 82 are formed by depositing a material 25 into space 24. At 92, the constituent features of the part 22 are levitated while the material 25 is being deposited into space 24. At 94, the constituent features of the part 22 are spatially manipulated.

Figure 14:
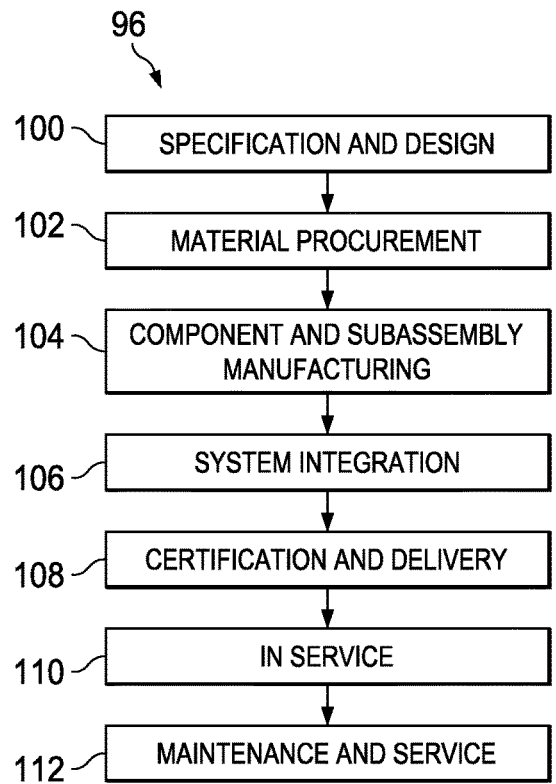
FIG. 14 is an illustration of a flow diagram of aircraft production and service methodology.
Figure 15:
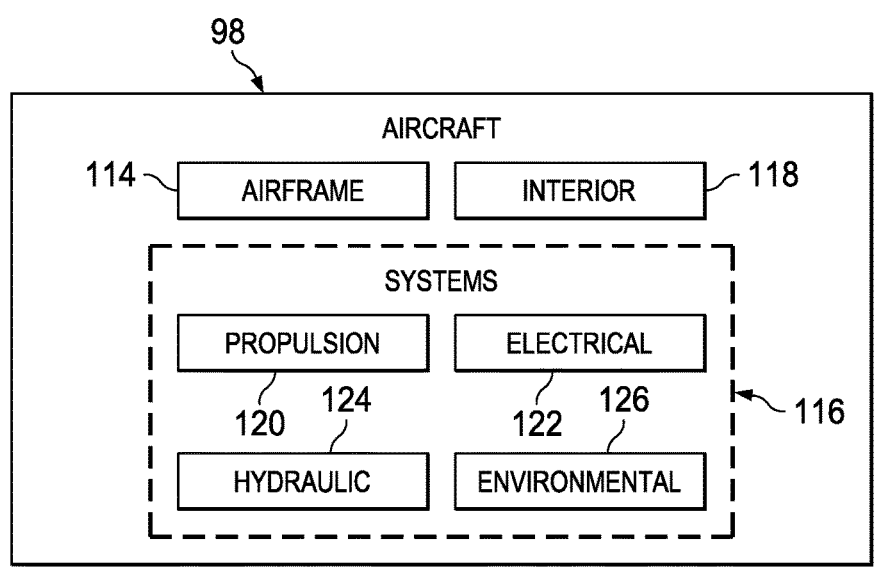
FIG. 15 is an illustration of a block diagram of an aircraft.

Embodiments of the disclosure may find use in a variety of potential applications, particularly in the transportation industry, including for example, aerospace, marine, automotive applications and other application where complex parts may be manufactured using additive fabrication techniques. Thus, referring now to FIGS. 14 and 15, embodiments of the disclosure may be used in the context of an aircraft manufacturing and service method 96 as shown in FIG. 14 and an aircraft 98 as shown in FIG. 15. During pre-production, exemplary method 96 may include specification and design 100 of the aircraft 98 and material procurement 102. During production, component and subassembly manufacturing 104 and system integration 106 of the aircraft 98 takes place. Thereafter, the aircraft 98 may go through certification and delivery 108 in order to be placed in service 110. While in service by a customer, the aircraft 98 is scheduled for routine maintenance and service 112, which may also include modification, reconfiguration, refurbishment, and so on. The disclosed method and apparatus may be used to print parts or components used during either of the processes 104 and 106, or later, when the aircraft 98 has been placed in service 110, as well as during maintenance and service 112 of the aircraft 98.

Each of the processes of method 96 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 98 produced by exemplary method 96 may include an airframe 114 with a plurality of systems 116 and an interior 118. Examples of high-level systems 116 include one or more of a propulsion system 120, an electrical system 122, a hydraulic system 124 and an environmental system 126. Any number of other systems may be included. The disclosed method and apparatus may be used to print any of a variety of parts and components forming part of the airframe 114, the interior 118 or any of the systems 116. Although an aerospace example is shown, the principles of the disclosure may be applied to other industries, such as the marine and automotive industries.

Systems and methods embodied herein may be employed during any one or more of the stages of the production and service method 96. For example, components or subassemblies corresponding to production process 104 may be fabricated or manufactured in a manner similar to components or subassemblies produced while the aircraft 98 is in service. Also, one or more apparatus embodiments, method embodiments, or a combination thereof may be utilized during the production stages 104 and 106, for example, by substantially expediting assembly of or reducing the cost of an aircraft 98. Similarly, one or more of apparatus embodiments, method embodiments, or a combination thereof may be utilized while the aircraft 98 is in service, for example and without limitation, to maintenance and service 112.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are the required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An additive fabrication method, comprising:
   forming a feature of a part by printing material into space;
   levitating the part by magnetic levitation, the magnetic levitation comprising super-cooling the part and subjecting the part to a magnetic field that produces a magnetic force repelling the part;
   changing a spatial orientation of the part while the part is levitating;
   forming another feature of the part by printing material into the space; and
   repeating the steps of changing the spatial orientation of the part and printing material into the space until an entire part is formed.

2. The additive fabrication method of claim 1, wherein forming the feature of the part is performed by:
   printing a nugget of the material into space, and
   printing additional material onto the nugget.

3. The additive fabrication method of claim 1, wherein forming the feature of the part is performed by:
   placing an object in the space,
   levitating the object, and
   printing material onto the object.

4. The additive fabrication method of claim 1, wherein printing material into space is performed by a plurality of print heads located at different positions around the space.

5. The additive fabrication method of claim 1, wherein levitating the part is performed by acoustic levitation.

6. The additive fabrication method of claim 1, wherein changing the spatial orientation of the part is performed using a levitation system.

7. The additive fabrication method of claim 1, wherein:
   levitating the part is performed by a applying a levitating force to the part which is substantially equal to a gravitational force acting on the part, and
   changing the spatial orientation of the part is performed altering the levitating force.

8. The additive fabrication method of claim 1, wherein printing material into space is performed from different directions by multiple print heads.

9. The additive fabrication method of claim 8, further comprising:
   changing a spatial orientation of the print heads relative to the part by moving the print heads relative to the part.

10. An additive fabrication method, comprising:
    forming differing constituent features of a part by depositing a material into space;
    levitating the constituent features of the part while the material is being deposited into space by magnetic levitation; and
    spatially manipulating the constituent features of the part;
    wherein the magnetic levitation is performed by:
    supercooling the part until the part becomes a superconductor, and
    subjecting the part to a magnetic field producing a magnetic force that is substantially equal to a gravitational force acting on the part.

11. The additive fabrication method of claim 10, wherein depositing a material into space is performed by a plurality of print heads.

12. The additive fabrication method of claim 10, wherein the levitating includes:
    producing an acoustic standing wave pattern having a node exhibiting a sound pressure force substantially equal to a gravitational force, and
    trapping the part within the node.

13. The additive fabrication method of claim 10, further comprising:
    sensing a position of the part in the space; and
    manipulating the part based on the sensed position of the part.

14. The additive fabrication method of claim 10, further comprising:
    stabilizing the part within the space.

15. The additive fabrication method of claim 10, wherein the levitating includes:
    placing a magnet beneath the part within the space, and
    generating a repulsive force between the part and the magnet that is substantially equal to a gravitational force acting on the part.

16. An apparatus for additive fabrication of a part, comprising:
    at least one print head for depositing a material into a space to form features of the part; and
    a levitation system for levitating the part in the space as the features are being formed by the print head, wherein the levitation system comprises magnetic levitation performed by supercooling the part until the part becomes a superconductor, and subjecting the part to a magnetic field producing a magnetic force that is substantially equal to a gravitational force acting on the part.

17. The apparatus of claim 16, further comprising:
    a plurality of print heads located around the space, each of the heads being capable of depositing material into the space to form features of the part.

18. The apparatus of claim 17, further comprising:
    a displacement system coupled with each of the print heads for displacing each of the print heads relative to the part.

19. The apparatus of claim 16, wherein the levitation system includes:
    at least one magnet for generating the magnetic force substantially equal to the gravitational force acting on the part.

20. The apparatus of claim 16, wherein the levitation system includes:
    at least one acoustic radiator for radiating a sound wave of alternating frequency, and
    an acoustic reflector positioned to reflect the sound wave, the acoustic radiator and the acoustic reflector arranged to form a standing wave pattern having a node in which the part is trapped and levitated.

21. The apparatus of claim 16, wherein the levitation system includes:
    position sensors for sensing the position of the part in the space, and
    a stabilization system for stabilizing levitation of the part.

* * * * *